April 7, 1936.  H. W. SANFORD  2,036,644
AUTOMATIC DROP-BOTTOM DUMP VEHICLE
Filed April 29, 1933  2 Sheets-Sheet 1
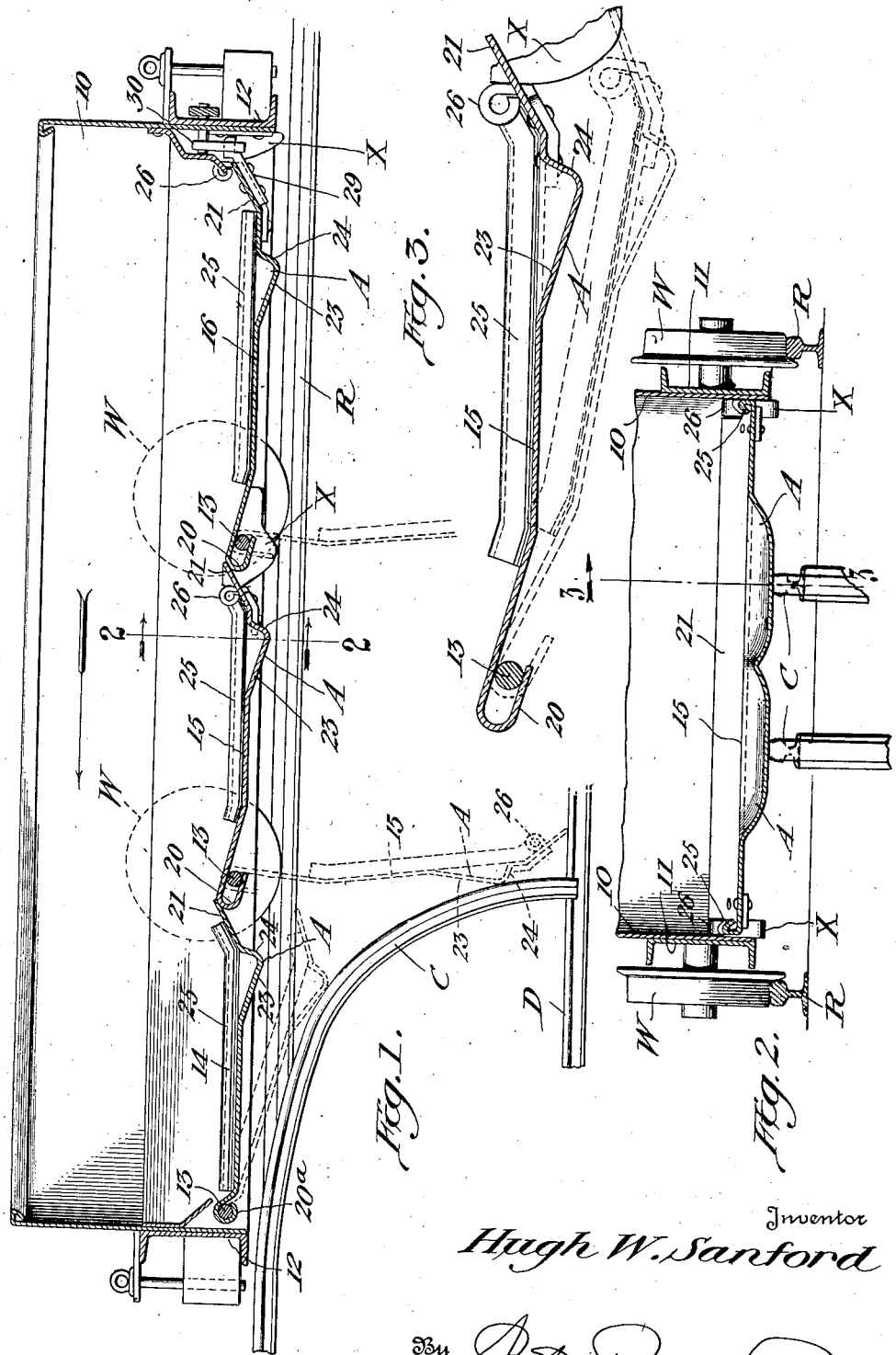
Inventor
Hugh W. Sanford
By
Attorneys.

April 7, 1936.  H. W. SANFORD  2,036,644
AUTOMATIC DROP-BOTTOM DUMP VEHICLE
Filed April 29, 1933  2 Sheets-Sheet 2
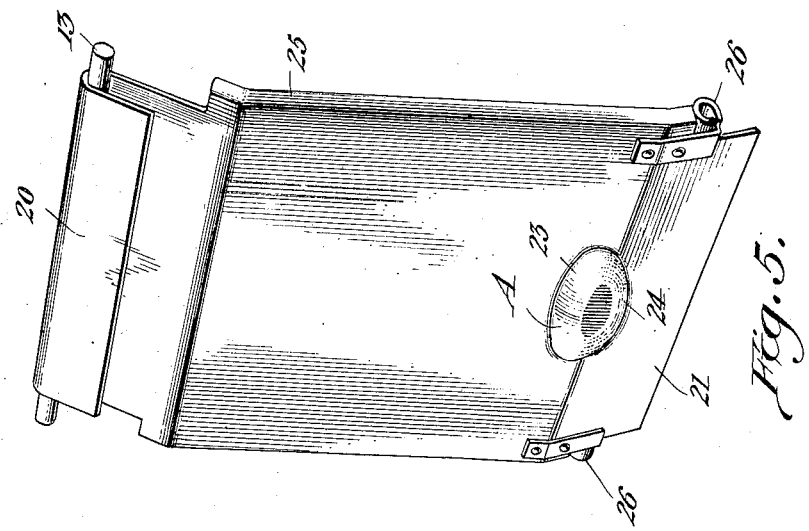
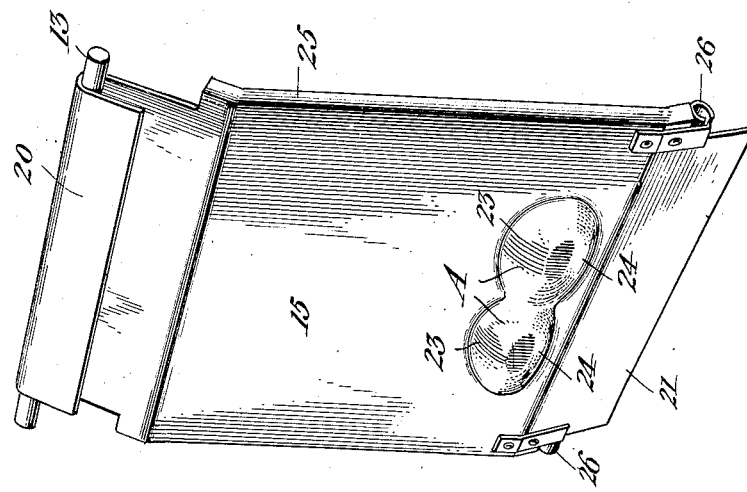
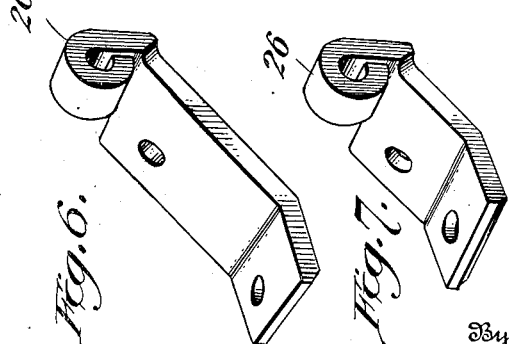
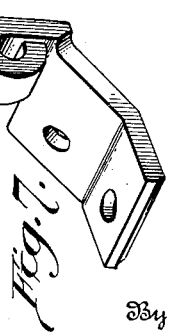
Inventor
Hugh W. Sanford
By
Attorneys.

Patented Apr. 7, 1936

2,036,644

UNITED STATES PATENT OFFICE 2,036,644

AUTOMATIC DROP-BOTTOM DUMP VEHICLE

Hugh W. Sanford, Knoxville, Tenn.

Application April 29, 1933, Serial No. 668,636

6 Claims. (Cl. 105—280)

This invention relates to improvements in automatic dump vehicles, and more particularly concerns the structure of an automatic door for employment in such vehicles.

A characteristic feature of the invention is the provision, in such a vehicle, of a door which permits the carrying of a maximum quantity of lading in the vehicle, and having formed integrally therein at least one contact portion adapted to engage the automatic closing-rail device which is located in the path of movement of the door when open at the dumping point, for accomplishing the automatic return of the door to closed position.

Other features of the invention will appear in the course of the following description and claims, in conjunction with the drawings which represent an illustrative form of practicing the invention, and in which:

Figure 1 is a longitudinal section through a rail car body, conventionally shown as moving past a dumping point along a right of way, and with doors thereof shown in full lines in a closed position, and with the two rear doors shown in dotted lines in pendent open position and with the front door shown in dotted lines as being closed by the closing rail device.

Figure 2 is a transverse upright sectional view, on a larger scale than that of Figure 1, and substantially on line 2—2 of Figure 1.

Figure 3 is an upright longitudinal sectional view, substantially on line 3—3 of Figure 2 omitting the showing of the closing rail device and showing the door in closed position in full lines and in partially opened position in dotted lines.

Figure 4 is a perspective view of a door, showing the bottom face thereof.

Figure 5 is a similar view of a modified form of door.

Figures 6 and 7 are detail views of wedging pieces.

In these drawings, the car body is illustrated conventionally as having side walls 10, including in this preferred form the sill members 11, with upright inner faces for containing the car lading. The side sills 11 have their lower edges located in a horizontal plane and are structurally designed to lie as closely as feasible to the rails upon which the car will travel. The side sills are joined at the ends by end structures including the end sills 12 which are shown as terminating at their lower portions in this same horizontal plane.

The traction truck frame comprising the sills 11 and 12 is supported by the conventionally represented wheels W which travel on the rails R, and which wheels have their axes above the said horizontal plane, and above the lading-supporting dump doors which will be described hereinafter.

In this illustrated form, likewise, the sills support transverse pivot rods 13 extending inwardly from the sills. Upon these rods are pivotally mounted the automatic drop-bottom doors 14, 15 and 16. In this illustrative form of the invention, the front door 14 has a fixed pivot, while the middle door 15 and the rear door 16 may not only swing about their pivotal supports, but also are permitted a bodily movement upon said pivotal supports. To this end the doors are each illustrated as formed of a sheet of metal which for the major portion of its length from front to rear is planar and is supported, when closed, with this planar portion substantially parallel to and slightly above the aforesaid horizontal plane of the lower edges of the side and end sills. At the front ends of doors 15 and 16, they are turned upwardly through a slight angle and rebent to form hooks 20 which fit the corresponding pivot rods 13 and permit a relative lengthwise movement of the doors with respect to the pivot rods. At the rear end of each door is provided likewise a portion 21 turned upwardly through a slight angle and retained, when the door is at lading-containing position, by the front edge of the next rearward door or by a latch piece.

Integrally formed in the rolled metal sheet of each door are the downwardly extending rail contact portions A which serve for engaging the closing-rail device C located in the path of movement of the opened door (Fig. 1) as the car leaves the dumping point. These portions A are formed by depressing the metal of the sheet downwardly and are illustratively shown as each having a forward wall 23 having a small angle to the planar portion, and a rear wall 24 having a greater angle. This rear wall 24, however, is preferably arranged at such an angle that when the door is in pendent position (shown in dotted lines, Fig. 1), the wall 24 is at a greater angle to the horizontal than the angle of repose of the lading, so that any particles of the lading which have been temporarily retained in the pockets formed by these contact portions are discharged therefrom by gravity.

The front door 14 is formed similarly, but since it need not make a bodily movement, it is feasible to form this door, from the rolled portion 20a engaged with its pivot rod 13 to the upwardly turned rear end 21, as a planar portion which is substantially horizontal when in closed position (full lines, Fig. 1). It likewise is provided with integrally formed closing-rail contact portions A.

In the form of construction shown in the perspective view of Figure 4, two such contact portions A are illustrated, these portions serving by their shape and arrangement to reinforce the door against downward yielding along both longitudinal and transverse axes. These contact portions occupy but a portion of the transverse dimension or width of the door, and are spaced from the lateral edges of the door so that by far the major portion is planar; and in particular the lateral parts are planar adjacent the side walls and hence may be located a very small distance above the aforesaid bottom plane, whereby a maximum capacity is afforded.

In order further to reinforce each door, it preferably is provided with the lateral curled edges 25 extending for the full length of the aforesaid planar portion and preferably also extending past the transverse ridges between this planar portion and the upwardly bent ends.

While closed, the middle and rear doors are held against a bodily backward movement by engagement adjacent their rear edges with the wedging pieces X secured to the body. For this purpose wear-receiving pieces 26 are provided at the lateral edges of each door (Fig. 4), being formed preferably of heavier metal and having curled ends for directly engaging the wedging pieces X. The upwardly bent rearward ends of these doors are cut away at the lateral rear corners to accommodate the wedging pieces X and engaging members 26. It will be noted that these engaging members further serve to reinforce the doors at these points.

The rear door 16 has secured thereto at its rear edge a member 29 which is provided with a pin extending rearwardly in a substantially horizontal direction when the door is closed, for engagement by the latch 30.

In the modified form of construction shown in Fig. 5, the single contact A is located centrally of the width of the door and extends past the ridge between the upwardly bent rear end 21 and serves to reinforce the door structure transversely and also directly at this ridge.

When in transport condition, the three drop-bottom doors 14, 15, 16 extend between the side sills 11 (Fig. 2), in this illustrative form, and retain the lading, but have their major portions planar and located slightly above the bottom plane of the side sills so that a maximum capacity is given the car. The upwardly turned front ends of the middle and rear doors 15 and 16 have but a slight angle to the horizontal, which is only sufficient for engagement over the pivot rods 13 which themselves are located closely adjacent this bottom plane of the side and end sills. At the rear ends, the several doors extend upwardly merely for a sufficient distance for interengagement with the next succeeding rearward door or with the latch 30. Thus, all parts of the doors are located above the horizontal planes of the corresponding longitudinally aligned lower parts of the end sills, except for the closing-rail contact portions A, and hence clearance is afforded (especially adjacent the rails) against raising of the doors by material lying between the track rails except for the limited transverse dimensions of these contact portions A.

When the car approaches a dumping point, the latch 30 is released in a known manner, and the rear door 16 is permitted to swing downward at its free edge, and by dragging along the right of way, by its own weight and by the weight of the lading upon it, it is caused to move bodily rearward with respect to its pivot point 13, thus withdrawing from beneath the rearward edge of the middle door 15 and permitting the latter in turn to move downward and rearward and thus in turn to release the front door 14. Thus all three doors open almost simultaneously, and as the car passes over an empty part of the bin, the lading is quickly and successively deposited at the dumping point.

As the car continues in its movement past the dumping point, the doors successively come into engagement with the closing-rail device C, which engages with the contact portions A of the doors and causes them to swing upwardly toward closed position. As the front door 14 is mounted on a fixed pivot (Fig. 1), it moves directly to the dotted line position, and finally to the full line closed position, and is held in such closed position by the substantially horizontal extension of the closing-rail device C. The middle door 15 is then swung upwardly (from the dotted line position, Fig. 1) by the closing-rail device C and as its rear edge members 26 encounter the surfaces of the wedging pieces X, the middle door 15 is caused to make a bodily movement with respect to its pivot connection 13 into the position shown in full lines Fig. 1, and at the end of its upward movement the door remains against the wedging pieces X which are secured on the side sills of the car. This swinging and bodily movement of the middle door 15 has brought its rebent front edge beneath the rear edge of the front door 14, so that the latter is now held in closed position independently of any action of the device C.

In turn, the rear door 16 encounters the closing-rail device C and is similarly swung upwardly, and by its engagement with closing wedge pieces X (Fig. 1) is likewise caused to make a bodily movement with respect to its pivot connection 13 until it occupies and is held in the position shown in full lines in Fig. 1, in which its front edge has been moved to a position beneath the rear edge of the middle door 15 and serves to hold this middle door in closed position. The latch 30 is now operated (by means not shown) toward and maintained in the holding position shown in full lines in Fig. 1, and thus retains the rear door 16 in its closed and forwardly moved position, with its front edge in holding relation beneath the rear edge of the middle door 15.

In such position, the parts have been restored to the condition for the transport of lading, and may leave the device C.

The construction of the door with the integral contact portions A permits a cheap manufacture of the door, and assists in reinforcement of the door adjacent its rear edge—the point at which these contact portions are preferably located. Further, such integral formation is preferable to the provision of separate castings or like pieces which are secured by bolts or rivets, as no loosening of these contact portions, or loss, is occasioned by their continual engagement with the closing-rail device C, and hence the doors are assured of a complete closing movement so long as the vehicle is capable of containing its lading.

It is obvious that many changes may be made in the invention, in departure from the specific form shown by the drawings and described above, without departing from the scope of the appended claims.

Having thus described the invention, what I claim as new and desire to secure by Letters Patent, is:

1. An automatic drop-bottom dump car door for closing by a rail located in the path of movement of the door when open, comprising a sheet of rolled metal having pivot means adjacent its front edge, and a restricted integrally formed downwardly extending rail contact portion of small area located remote from the front edge and spaced from the lateral edges thereof, the thickness of metal in said contact portion being substantially the same as that in the rest of said sheet.

2. An automatic drop-bottom dump car door for closing by a rail located in the path of movement of the door when open, comprising a sheet of rolled metal having pivot means adjacent its front edge, and a restricted, integrally formed downwardly extending rail contact portion of small area located remote from the front edge and spaced from the lateral edges thereof, the thickness of metal in said contact portion being substantially the same as that in the rest of said sheet, said portion having its lading-receiving wall surfaces located at such angles to the rest of the sheet that said surfaces are all at greater angles to the horizontal than the angle of repose of the lading after the door has swung open for discharge.

3. An automatic drop-bottom dump car door for closing by a rail located in the path of movement of the door when open, comprising a sheet of rolled metal which is planar for the major portion of its length from front to rear and is planar adjacent both lateral edges and has its front and rear ends turned upwardly through a small angle, and a restricted, integrally formed closing-rail contact portion of small area of said door extending downwardly closely adjacent the junction of said rear end and planar portion and spaced from the lateral edges of the door.

4. A drop-bottom dump car including upright side wall portions and end walls, at least one of said end walls having its lower edge located substantially in the horizontal plane of the lower edges of the side wall portions, transverse pivot means extending inward between the side walls, a drop-bottom door comprising a rolled sheet of metal having pivot means adjacent its front edge cooperative with said transverse pivot means for supporting the door for swinging movement, the major portion of said sheet when in closed position being located in a horizontal plane above said first horizontal plane, said sheet also having a laterally and longitudinally restricted integrally formed closing-rail contact portion extending downwardly past said first plane, and means for holding said door closed.

5. A drop-bottom dump car including upright side wall portions and end walls, the lower edges of the end walls defining a horizontal plane, transverse pivot means extending inward between the side walls close above said plane, a drop-bottom door mounted on said pivot means and having the major portion of its length located below said pivot means and above said plane when in closed position, and means located above said plane for supporting said door in closed position, said door including a rolled metal sheet having an integrally formed laterally and longitudinally restricted closing-rail contact portion constituting the sole projection of the door below said plane when the door is closed.

6. An automatic drop-bottom dump car door for closing by a rail located in the path of movement of the door when open, comprising a rolled sheet of metal having pivot means adjacent its front edge, the major portion of the sheet being substantially planar, a rear edge portion bent obliquely upward for interengagement with another door, and a laterally restricted, integrally formed downwardly extending rail contact portion of small area spaced from the lateral edges and extending longitudinally across the bend between the major and rear edge portions whereby to reinforce the sheet longitudinally and transversely.

HUGH W. SANFORD.